US007423261B2

(12) United States Patent
Truche et al.

(10) Patent No.: US 7,423,261 B2
(45) Date of Patent: Sep. 9, 2008

(54) CURVED CONDUIT ION SAMPLING DEVICE AND METHOD

(75) Inventors: Jean-Luc Truche, Los Altos, CA (US); Paul C. Goodley, Cupertino, CA (US); Steven M. Fischer, Hayward, CA (US); Jian Bal, Sunnyvale, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 344 days.

(21) Appl. No.: 11/398,163

(22) Filed: Apr. 5, 2006

(65) Prior Publication Data

US 2007/0235642 A1 Oct. 11, 2007

(51) Int. Cl.
*B01D 59/44* (2006.01)
*H01J 49/00* (2006.01)

(52) U.S. Cl. ....................... 250/288; 250/281; 250/282; 250/284; 250/287; 250/423 P; 250/423 F; 250/424; 250/425; 250/426; 250/252.1; 250/304

(58) Field of Classification Search ................. 250/281, 250/282, 284, 287, 288, 423 P, 423 F, 424, 250/425, 426, 252.1, 304
See application file for complete search history.

(56) References Cited

U.S. PATENT DOCUMENTS 6,621,076 B1 * 9/2003 van de Goor et al. ....... 250/288
7,078,681 B2 * 7/2006 Fischer et al. ............... 250/288

* cited by examiner

*Primary Examiner*—Jack I. Berman
*Assistant Examiner*—Meenakshi S Sahu

(57) ABSTRACT

An ion sampling apparatus for use in a mass spectrometry system. The ion sampling apparatus includes a target support for receiving a sample, an irradiation source for emitting energetic radiation or particles toward the target support, and a conduit having a curved end and a longitudinal axis, the curved end having an inlet with a central axis, the conduit being adjacent to the target support. The longitudinal axis of the conduit and the central axis of the inlet intersect to define an angle that is between about 20 degrees and about 210 degrees.

28 Claims, 2 Drawing Sheets

CURVED CONDUIT ION SAMPLING DEVICE AND METHOD

BACKGROUND INFORMATION

In surface ionization techniques, an analyte sample is first deposited on a plate surface, then desorbed from the surface and ionized by irradiation. The irradiation of the surface may be performed using a laser, or with a particle or ion beam, for example. The desorbed ions can be captured for analysis by a conduit leading to a mass spectrometer instrument using pneumatic and/or electrostatic forces. Currently, the most widely used surface ionization technique is matrix-assisted laser desorption ionization (MALDI). In this technique, samples are diluted in an ultraviolet(UV)-absorbing matrix material, then deposited on a sample plate, on which the mixed sample and matrix are co-crystallized by drying. A focused pulse of UV laser radiation is then directed onto the sample. The energy of the pulse is absorbed by the matrix material, which is desorbed from the surface and ionized, carrying with it analytes, which are ionized in turn by charge transfer processes.

In particle bombardment, a similar apparatus setup is employed, but instead of directing laser radiation onto the sample, a stream of particles, typically ions, is generated by electrospray ionization or another ionization process and is directed onto the sample. Analyte ions are generated by the impact of the ions on the sample, and related charge transfer processes that occur due to such impact.

In conventional configurations, the analyte ions generated using a MALDI or particle ionization source are drawn into the inlet of a straight conduit leading to a mass spectrometer. The proximal end of the conduit including the inlet is oriented orthogonally with respect to the sample-bearing plate surface. Typically, the conduit is also oriented along the longitudinal axis of the mass spectrometer, which is usually horizontal. This dictates that the sample-bearing surface be oriented vertically to be orthogonal to the conduit. This vertical configuration can be disadvantageous for certain applications. Moreover, the conduit is often not in the optimal position or orientation for receiving ions desorbed from the plate surface, reducing the collection efficiency of the ionization source.

SUMMARY OF THE INVENTION

The present invention provides an ion sampling device comprising a curved-tip conduit that maintains ion collection efficiency while enabling much greater flexibility in the arrangement of the sample-bearing support and the source of ionization energy.

In a first aspect, the present invention provides an ion sampling apparatus for use in a mass spectrometry system that comprises a target support having a surface for receiving a sample, an irradiation source for emitting energetic radiation or particles onto the target support, and a conduit having a curved end and a longitudinal axis, the curved end having an inlet having a central axis, the conduit being adjacent to the target support. The longitudinal axis of the conduit and the central axis of the inlet intersect to define an angle that is between about 20 degrees and about 210 degrees.

In a second aspect, the present invention provides a mass spectrometry system having a MALDI ionization source that comprises a target support having a surface for receiving a sample, a laser source oriented to emit a laser beam onto the target support, a conduit having a curved end, a longitudinal axis and an exit, the curved end having an inlet having a central axis, the conduit being adjacent to the target support, and a mass spectrometer positioned downstream from the conduit, wherein the inlet of the conduit faces the target support.

In another aspect, the present invention provides a method of efficiently sampling ions from a surface comprising irradiating the surface to generate ions and receiving the ions in a curved conduit having a longitudinal axis and an inlet with a central axis. The longitudinal axis of the conduit and the central axis of the inlet intersect to define an angle that is between about 20 degrees and about 210 degrees.

DETAILED DESCRIPTION

Before describing the present invention in detail, it must be noted that, as used in this specification and the appended claims, the singular forms "a," "an," and "the" include plural referents unless the context clearly dictates otherwise.

The term "conduit" should be interpreted broadly to include any passageway that extends for some length and may comprise a capillary, tube, nanotube, pipe, channel, or microchannel among other possible implementations.

The term "adjacent" means near, next to or adjoining. Something adjacent may also be in contact with another component, surround (i.e. be concentric with) the other component, be spaced from the other component or contain a portion of the other component.

An "irradiation source" refers to a device that emits energetic radiation or particles, such as ions and uncharged particles.

Figure 1:
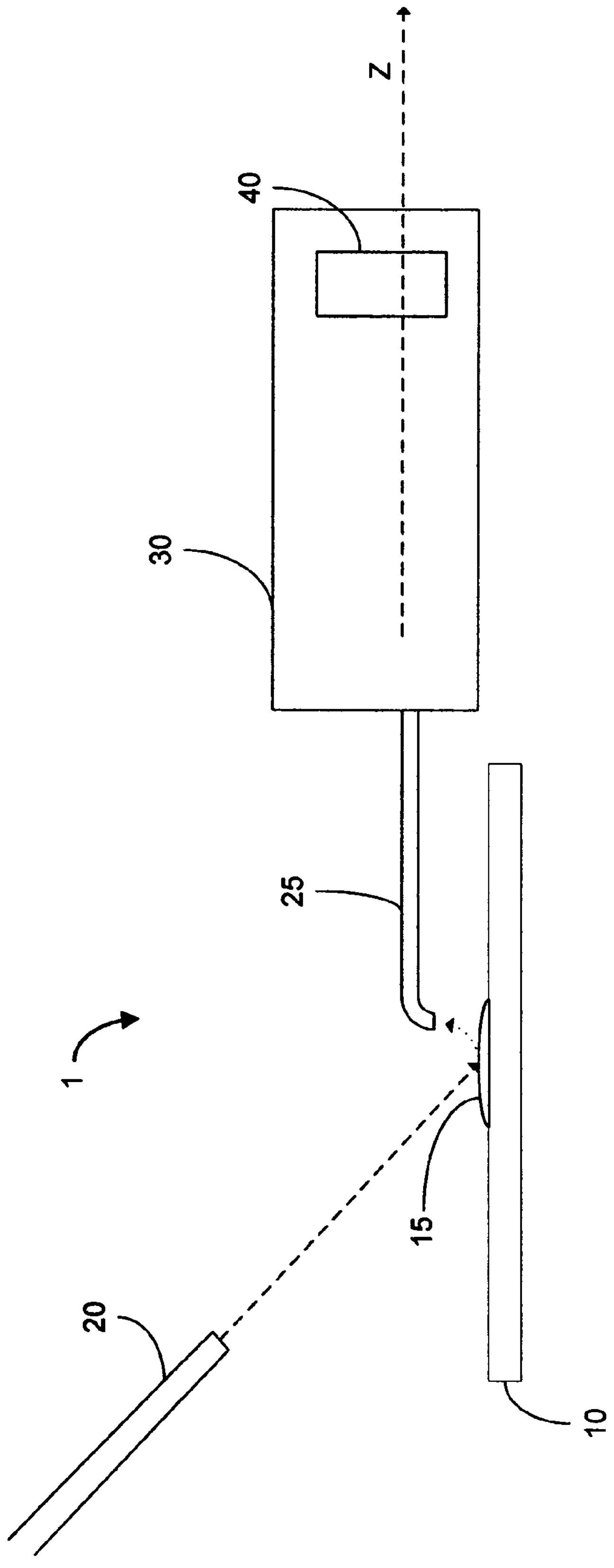
FIG. 1 shows an exemplary mass spectrometer system including a surface ionization source according to the present invention.

FIG. 1 depicts an exemplary mass spectrometry system 1 including a MALDI, particle bombardment or other surface ionization source. The system 1 includes a target support 10 bearing an analyte sample 15 which may be embedded in a matrix material. The target support 10 may be any support known in the art for holding analyte samples including a well-plate, a mesh, a planar surface, a functionalized surface or treated surface including structural features such as carbon nanotubes, etc. In the embodiment depicted, the target support 10 is oriented horizontally, and the may be movable in the horizontal plane (side to side and into and out of the page) by electromechanical means, for example. The analyte sample 15 may be placed at a specific location (in X, Y coordinates) on the target support 10, so that its location is known as the target support changes location. The target support 10 and analyte sample 15 may be placed in a region at atmospheric pressure, although this is not necessary.

An irradiation source 20, which may comprise an ultraviolet laser source or a particle bombardment source is positioned and oriented to direct a pulsed beam of laser radiation or a particle stream toward the analyte sample 15 on the target support. The impact of the laser radiation or particle beam (as the case may be) transfers sufficient energy to desorb matrix and analyte molecules, and to ionize a portion thereof directly or by charge transfer processes. Suitable particle bombardment sources may include one or more of: an electrospray ionization source; a chamber through which a high-velocity gas contacts a surface, stripping electrons from the surface and causing subsequent ion formation from the gas; a penning ionization source such as used in Direct Analysis in Real Time (DART) applications as known in the art; and a fast atom bombardment (FAB) source as also known in the art, among other possible sources of energetic particles or ions.

The desorbed analyte (and matrix) ions are ejected from the target support surface and may have some forward momentum imparted by the ionization energy source. The proximal end of a conduit 25 that leads to a mass spectrometer 30 is positioned adjacent to the target support 10 so as to capture the desorbed analyte ions. A pressure differential between the entrance to the conduit 25 and the exit of conduit 25 creates a continuous flow inside the conduit 25 that draws desorbed analyte ions into the inlet at the proximal end of the conduit and carries them downstream toward the distal end into the mass spectrometer 30. Within the mass spectrometer 30, the analyte ions are transported to a mass analyzer 40, where they are selected according to their respective mass-to-charge (m/z) ratios and detected.

The conduit 25 has a longitudinal axis that may be aligned with the longitudinal axis of the mass spectrometer 30 (denoted as the 'z' axis) which is often horizontal as depicted. The proximate end 28 of the conduit is curved, and at the tip of the curved end is an inlet 29 for receiving analyte ions desorbed from the sample 15. By having the proximal end 28 of the conduit curved, analyte ion capture efficiency is not impaired by any arrangement of the target support 10 with respect to the mass spectrometer 30. This is possible because ions can be conducted through a curved conduit with the same transmission efficiency as through a straight conduit, due to the continuous gas flow maintained inside the conduit.

The inlet 29 of the conduit has a central axis that is aligned at an angle (θ) with respect to the longitudinal axis of the conduit 25 at their point of intersection. The angle (θ) is considered to be 180 degrees when the central axis of the inlet 29 (pointing out of the inlet away from the conduit) is oriented backwards in the direction of the z-axis of the mass spectrometer (as shown in FIG. 2C). As indicated further below in the discussion of the exemplary embodiments, the angle (θ) can be any angle between 20 and 210 degrees.

Figure 2A:
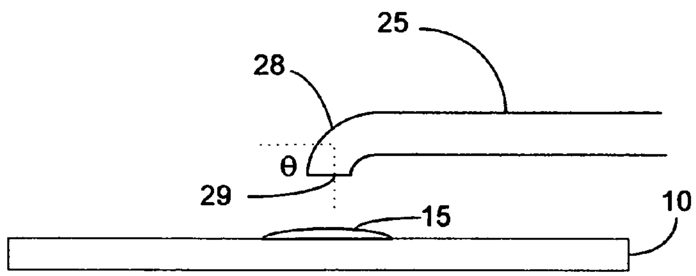
FIG. 2A illustrates an embodiment of a curved-tip conduit according to the present invention.
Figure 2B:
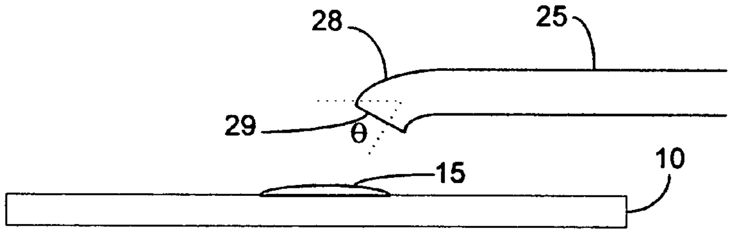
FIG. 2B illustrates another embodiment of a curved-tip conduit according to the present invention in which the curved portion of the conduit is bent at an acute angle.
Figure 2C:
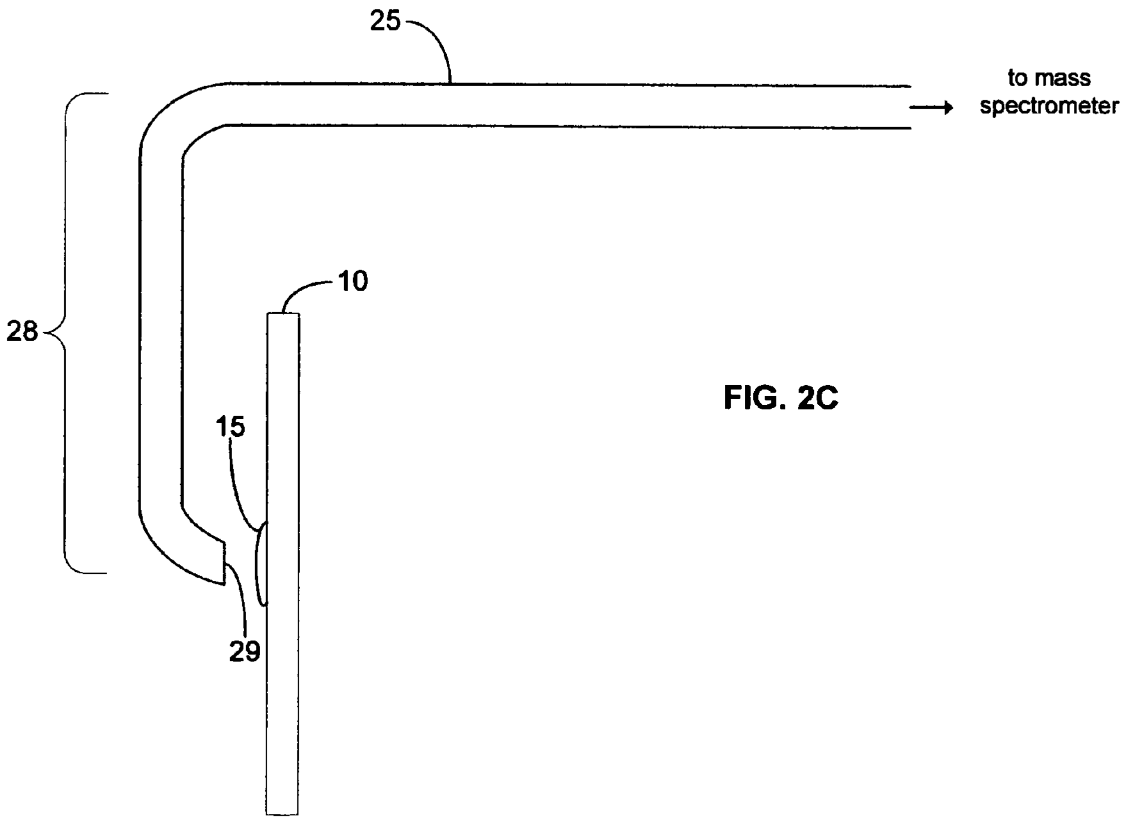
FIG. 2C illustrates another embodiment of a curved-tip conduit according to the present invention in which the curved portion of the conduit is bent back in the direction of the mass spectrometer.

FIGS. 2A-2C illustrate different embodiments of the curved-tip conduit sampling device of the present invention.

In the embodiment shown in FIG. 2A, the proximal end 28 of the conduit is curved such that the angle (θ) between the central axis of the inlet 29 and the longitudinal axis of the conduit 25 is between 75 and 105 degrees, or more preferably, about 90 degrees. In this configuration, the central axis of the inlet 29 is oriented approximately perpendicularly facing the target support 10 and is optimally oriented for ion collection. One of the advantages of this embodiment is that the plane of the target support 10 is parallel to the longitudinal axis of the conduit 25. Since the longitudinal axis the conduit 25 is aligned with the z-axis of the mass spectrometer 30, which is usually horizontal, the target support 10 can also be kept horizontal. A horizontal configuration allows the support 10 to hold samples that would otherwise fall or run off in other configurations. For example, in this configuration, the support 10 may include shallow indentations or wells on its surface which can hold liquid samples.

In the embodiment shown in FIG. 2B, the proximal end 28 of the conduit 25 is curved such that the angle (θ) between the central axis of the inlet 29 and the longitudinal axis of the conduit 25 is at an acute or oblique angle between 20 and 70 degrees. Thus, the inlet is at an acute angle with respect to a line normal to the surface of the target support. This embodiment may be particularly useful in certain surface ionization applications in which analyte ions can emerge from the support with an angular trajectory (forward momentum). It is noted that the angle of the curved portion of the conduit 28 can be set at any angle in the range found to maximize analyte ion collection efficiency.

FIG. 2C shows another embodiment of a curved-tip conduit according to the present invention in which the proximate end 28 of the conduit 25 includes a first counter-clockwise bend followed by a straight extension, and a second counter-clockwise bend such that the angle (θ) between the central axis of the inlet 29 and the longitudinal axis of the conduit 25 is between 160 and 200 degrees, or more preferably at about 180 degrees. In this configuration, the inlet 29 of the conduit faces backwards in the direction of the mass spectrometer. This allows an arrangement in which the target support 10 is oriented vertically, but where the front side of the target support 10 bearing the analyte sample 15 faces away from the mass spectrometer, allowing a further degree of flexibility with regard to the positioning of the source of ionization energy. In this exemplary embodiment, as in the exemplary embodiment shown in FIG. 2A, the central axis of the inlet 29 is oriented approximately perpendicularly facing the target support 10, and is optimally oriented for ion collection.

It is noted that the embodiments shown in FIGS. 2A-2C are exemplary and that the angle (θ) between the longitudinal axis of the conduit 25 and the central axis of the inlet 29 may be set at other angles, such as between 110 and 160 degrees, for example. It should also be noted that the length and height of the conduit with respect to the target support (and thus the precise position of the inlet of the conduit with respect to the analyte sample) are adjustable in all embodiments in accordance with the knowledge and skill of those of skill in the art attendant to varied experimental results and/or specific applications and modifications thereof.

Having described the present invention with regard to specific embodiments, it is to be understood that the description is not meant to be limiting since further modifications and variations may be apparent or may suggest themselves to those skilled in the art. It is intended that the present invention cover all such modifications and variations as fall within the scope of the appended claims.

What is claimed is:

1. An ion sampling apparatus for use in a mass spectrometry system comprising:

a target support having a surface for receiving a sample;

an irradiation source for emitting energetic radiation or particles onto the target support surface; and a conduit having a curved end and a longitudinal axis, the curved end having an inlet having a central axis, the conduit being adjacent to the target support;

wherein the longitudinal axis of the conduit and the central axis of the inlet intersect to define an angle that is between about 20 degrees and about 210 degrees.

2. The ion sampling apparatus of claim 1, wherein the angle defined between the longitudinal axis of the conduit and the central axis of the inlet is between about 75 degrees and about 105 degrees.

3. The ion sampling apparatus of claim 2, wherein the angle defined between the longitudinal axis of the conduit and the central axis of the inlet is about 90 degrees.

4. The ion sampling apparatus of claim 3, wherein the target support surface is oriented parallel to the longitudinal axis of the conduit such that the central axis of the inlet is perpendicular to and faces the target support surface.

5. The ion sampling apparatus of claim 1, wherein the angle defined between the longitudinal axis of the conduit and the central axis of the inlet is between about 20 degrees and about 70 degrees.

6. The ion sampling apparatus of claim 5, wherein the target support surface is oriented parallel to the longitudinal axis of the conduit such that the central axis of the inlet is at an acute angle with respect to a line normal to the target support surface.

7. The ion sampling apparatus of claim 1, wherein the angle defined between the longitudinal axis of the conduit and the central axis of the inlet is between about 160 degrees and about 200 degrees.

8. The ion sampling apparatus of claim 7, wherein the angle defined between the longitudinal axis of the conduit and the central axis of the inlet is about 180 degrees.

9. The ion sampling apparatus of claim 7, wherein the target support surface is oriented perpendicularly to the longitudinal axis of the conduit such that the central axis of the inlet is perpendicular to and faces the target support surface.

10. The ion sampling apparatus of claim 1, wherein a continuous flow of gas is maintained within the conduit.

11. The ion sampling apparatus of claim 1, wherein irradiation source comprises a laser.

12. The ion sampling apparatus of claim 11, wherein the ion sampling apparatus is maintained at atmospheric pressure.

13. The ion apparatus of claim 1, wherein the irradiation source comprises a particle bombardment source.

14. A mass spectrometry system having a MALDI ionization source comprising:

a target support having a surface for receiving a sample;

a laser source oriented to emit a laser beam onto the target support surface;

a conduit having a curved end and a longitudinal axis, the curved end having an inlet having a central axis, the conduit being adjacent to the target support; and a mass spectrometer positioned downstream from the conduit;

wherein the inlet of the conduit faces the target support.

15. The mass spectrometry system of claim 14, wherein the MALDI ionization source comprises an AP-MALDI ionization source.

16. The mass spectrometry system of claim 14, wherein the longitudinal axis of the conduit and the central axis of the inlet intersect to define an angle that is between about 75 degrees and about 105 degrees.

17. The mass spectrometry system of claim 16, wherein the angle defined between the longitudinal axis of the conduit and the central axis of the inlet is about 90 degrees.

18. The mass spectrometry system of claim 16, wherein the target support surface is oriented parallel to the longitudinal axis of the conduit.

19. The mass spectrometry system of claim 18, wherein the target support includes an indentation for holding a liquid sample.

20. The mass spectrometry system of claim 14, wherein the longitudinal axis of the conduit and the central axis of the inlet intersect to define an angle that is between about 160 degrees and about 200 degrees.

21. The mass spectrometry system of claim 20, wherein the angle defined between the longitudinal axis of the conduit and the central axis of the inlet is about 180 degrees.

22. The mass spectrometry system of claim 20, wherein the target support surface is oriented perpendicularly to the longitudinal axis of the conduit.

23. A method of efficiently sampling ions from a surface comprising:

irradiating the surface to generate ions;

receiving the ions in a curved conduit having a longitudinal axis and an inlet having a central axis;

wherein the longitudinal axis of the conduit and the central axis of the inlet intersect to define an angle that is between about 20 degrees and about 210 degrees.

24. The method of claim 23, wherein the longitudinal axis of the conduit and the central axis of the inlet intersect to define an angle that is between about 75 degrees and about 105 degrees.

25. The method of claim 23, wherein the longitudinal axis of the conduit and the central axis of the inlet intersect to define an angle that is between about 20 degrees and about 70 degrees with respect to the first direction.

26. The method of claim 23, wherein the surface is oriented horizontally and the central axis of the inlet is oriented perpendicularly to the surface.

27. The method of claim 23, wherein the irradiating comprises emitting a laser onto the surface.

28. The method of claim 23, wherein the irradiating comprises bombarding the target support surface with a beam of particles.

* * * * *